US010674338B2

(12) United States Patent
Jiao

(10) Patent No.: US 10,674,338 B2
(45) Date of Patent: Jun. 2, 2020

(54) METHOD AND DEVICE FOR COMMUNICATIONS

(71) Applicant: China Academy of Telecommunications Technology, Beijing (CN)

(72) Inventor: Bin Jiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 8 days.

(21) Appl. No.: 15/576,771

(22) PCT Filed: Mar. 28, 2016

(86) PCT No.: PCT/CN2016/077556
§ 371 (c)(1),
(2) Date: Nov. 24, 2017

(87) PCT Pub. No.: WO2016/188219
PCT Pub. Date: Dec. 1, 2016

(65) Prior Publication Data
US 2018/0302773 A1    Oct. 18, 2018

(30) Foreign Application Priority Data

May 26, 2015    (CN) .......................... 2015 1 0276443

(51) Int. Cl.
*H04W 4/70*    (2018.01)
*H04L 29/06*    (2006.01)
(Continued)

(52) U.S. Cl.
CPC .............. *H04W 4/70* (2018.02); *H04L 63/20* (2013.01); *H04W 4/06* (2013.01); *H04W 12/06* (2013.01);
(Continued)

(58) Field of Classification Search
CPC ... H04W 4/023; H04W 84/18; H04W 88/184; H04W 12/06; H04W 48/16; H04W 4/06;
(Continued)

(56) References Cited

U.S. PATENT DOCUMENTS

| 2014/0304383 | A1  | 10/2014 | Guo et al. |
| 2014/0330925 | A1  | 11/2014 | Lee et al. |
| 2014/0355430 | A1* | 12/2014 | Smith ............... H04W 28/0263 370/230 |

FOREIGN PATENT DOCUMENTS

| CN | 102164425 A | 8/2011 |
| CN | 102804882 A | 11/2012 |

(Continued)

OTHER PUBLICATIONS

Manjeshwar A et al: 11 APTEEN: a hybrid 1-15, protocol for efficient routing and comprehensive informat ion retrieval in wireless, Parallel and Distributed Processing Symposium., Proceedings International, IPDPS 2002, Abstracts and CD-ROM Ft .Lauderdale, FL, USA Apr. 15-19, 2002, Los Alamitos, CA, USA.IEEE Comput. Soc, US, Apr. 15, 2001 (Apr. 15, 2001), p. 8pp, XP032343270.

*Primary Examiner* — Ajibola A Akinyemi
(74) *Attorney, Agent, or Firm* — Foley & Lardner LLP

(57) ABSTRACT

Disclosed are a method and device for communications, comprising: on a distributed service center, determining function parameter configuration information of the distributed service center, where the function parameter configuration information comprises: a distributed service center device identification, a network identification, a cluster identification, cluster information, a service identification, network service center identification or address information of a core network; determining communication needs on the distributed service center on the basis of the function parameter configuration information, and transmitting a communication request message to a corresponding device. When (Continued)

the communication request message transmitted by the distributed service center is received by a network service center device of the core network, the device responds on the basis of the communication request message. When a system broadcast message transmitted via an air interface is received by an end point node, same updates cluster state information on the basis of the system broadcast message. Employment of the present invention not only reduces the load that an access device incurs on the core network in storage and signal processing, but also localizes a control function, thus greatly reducing delay caused by a control plane signaling process.

18 Claims, 9 Drawing Sheets

(51) Int. Cl.
| | | |
|---|---|---|
| *H04W 76/10* | (2018.01) | |
| *H04W 4/06* | (2009.01) | |
| *H04W 12/06* | (2009.01) | |
| *H04W 84/20* | (2009.01) | |
| *H04W 84/18* | (2009.01) | |
| *H04W 4/08* | (2009.01) | |
| *H04L 12/24* | (2006.01) | |
| *H04W 92/04* | (2009.01) | |
| *H04W 92/18* | (2009.01) | |

(52) U.S. Cl.
CPC ............. *H04W 76/10* (2018.02); *H04L 41/50* (2013.01); *H04W 4/08* (2013.01); *H04W 84/18* (2013.01); *H04W 84/20* (2013.01); *H04W 92/04* (2013.01); *H04W 92/18* (2013.01)

(58) Field of Classification Search
CPC ......... H04W 4/08; H04W 4/70; H04W 76/10; H04W 84/04; H04W 84/042; H04W 84/20; H04W 84/22; H04W 88/08; H04W 88/16; H04W 92/04; H04W 92/18
USPC ....................................................... 455/41.2
See application file for complete search history.

(56) References Cited

FOREIGN PATENT DOCUMENTS

| | | |
|---|---|---|
| CN | 102907068 A | 1/2013 |
| CN | 102907139 A | 1/2013 |
| CN | 103782529 A | 5/2014 |
| CN | 104378730 A | 2/2015 |
| WO | WO-2009/104171 A2 | 8/2009 |
| WO | WO-2011/087826 A1 | 7/2011 |
| WO | WO-2011/123755 A1 | 10/2011 |
| WO | WO-2014/203205 A1 | 12/2014 |

* cited by examiner

METHOD AND DEVICE FOR COMMUNICATIONS

This application is a National Stage of International Application No. PCT/CN2016/077556, filed Mar. 28, 2016, which claims the benefit of Chinese Patent Application No. 201510276443.8, filed with the Chinese Patent Office on May 26, 2015 and entitled "Communication method and device", both of which are hereby incorporated by reference in their entireties.

FIELD

The present invention relates to the field of communications, and particularly to a communication method and device concerning to a machine-type equipment.

BACKGROUND

FIG. 1 is a schematic architectural diagram of an existing cellular network, and as illustrated, in the existing cellular system, a terminal determines a serving base station according to the strength of a downlink pilot signal, and the serving base station is responsible for providing the accessing terminal with a data transmission service. The serving base station forwards uplink data received from the terminal to a core network. The core network is responsible for verifying the identity of the terminal, storing context information of the terminal, and providing the accessing terminal with a connectivity service to an external network.

In the related art, the terminal is registered with the network in an Attach procedure. While the terminal is being registered with the network, a Mobility Management Entity (MME) of the core network is responsible for storing state information of the terminal, including security context information, activated session information, positional area information, etc. The state information of the terminal is stored in the core network, so if the accessing terminal is a machine-type terminal, then there may be two problems as follows.

Firstly the number of machine-type terminals is expected to go far beyond the number of existing terminals (up to the level of possibly 50 to 100 billions as anticipated), so if a complete context is created in the core network for each machine-type terminal, then there may be an unacceptable storage burden for the core network; and secondly the core network is also involved in a connectivity management function of the existing terminal, and this means that a lot of signaling in the core network may be produced each time when the terminal becomes connected, so if a large number of machine-type terminals access the network, there may be easily a storm of signaling.

SUMMARY

Embodiments of the invention provide a communication method and device so as to reduce a burden of storage and signaling handling on a core network clue to an accessing device.

An embodiment of the invention provides a communication method including: determining functional parameter configuration information of a DSC, wherein the functional parameter configuration information includes one or a combination of: a DSC device identifier, a network identifier, a cluster identifier, cluster information, a service identifier, and a NSC identifier of a core network and NSC address information of the core network; determining a communication demand on the DSC according to the functional parameter configuration information; and transmitting a communication request message to a corresponding device.

An embodiment of the invention provides a communication method including: receiving a communication request message transmitted by a DSC; and responding to the communication request message.

An embodiment of the invention provides a communication method including: receiving a system broadcast message transmitted via an air interface, wherein the system broadcast message includes one or a combination of a DSC device identifier, a network identifier, a cluster identifier, and a service identifier; and updating cluster state information according to the system broadcast message.

An embodiment of the invention provides a communication device including: an information determining module configured to determine functional parameter configuration information of a DSC, wherein the functional parameter configuration information includes one or a combination of: a DSC device identifier, a network identifier, a cluster identifier, cluster information, a service identifier, and a NSC identifier of a core network and NSC address information of the core network; a demand determining module configured to determine a communication demand on the DSC according to the functional parameter configuration information; and an executing module configured to transmit a communication request message to a corresponding device.

An embodiment of the invention provides a communication device including: a message receiving module configured to receive a communication request message transmitted by a DSC; and a message responding module configured to respond to the communication request message.

An embodiment of the invention provides a communication device including: a broadcast receiving module configured to receive a system broadcast message transmitted via an air interface, wherein the system broadcast message includes one or a combination of a DSC device identifier, a network identifier, a cluster identifier, and a service identifier; and an updating module configured to update cluster state information according to the system broadcast message.

Advantageous effects of the invention are as follows.

In embodiments of the invention, the dynamic distributed network architecture can be put into operation to reduce a burden of storage and signaling handling on the core network due to an accessing device; and also the control function can be localized to thereby greatly shorten a delay in the control-plane signaling procedure.

BRIEF DESCRIPTION OF THE DRAWINGS

The drawings described below are intended to provide further understanding of the invention, constitute a part of the invention, and serve together with the exemplary embodiments of the invention, and the description thereof to set forth the invention, but not to limit the invention unduly.

DETAILED DESCRIPTION OF THE EMBODIMENTS

Due to a large number of machine-type terminals, in order to reduce a burden on a core network, and to avoid a storm of signaling from possibly occurring, an MTC-like terminal is managed over a "distributed dynamic network" in the technical solutions according to the embodiments of the invention.

Firstly an implementation context will be described below.

In a Bluetooth system operating with a MESH (self-organized or infrastructureless) network model, a cluster head and a series of endpoints constitute a cluster, where the endpoints in the cluster are controlled by the cluster device to communicate with each other. The endpoints communicate with each other in the cluster in the unlicensed frequency band of 2.4 GHz in a frequency hop mode in which interference to each other can be avoided. There are a statically configured channel and security parameters between the cluster header and an endpoint. Respective clusters are independent of each other, and endpoint members in the different clusters cannot communicate with each other.

Figure 1:
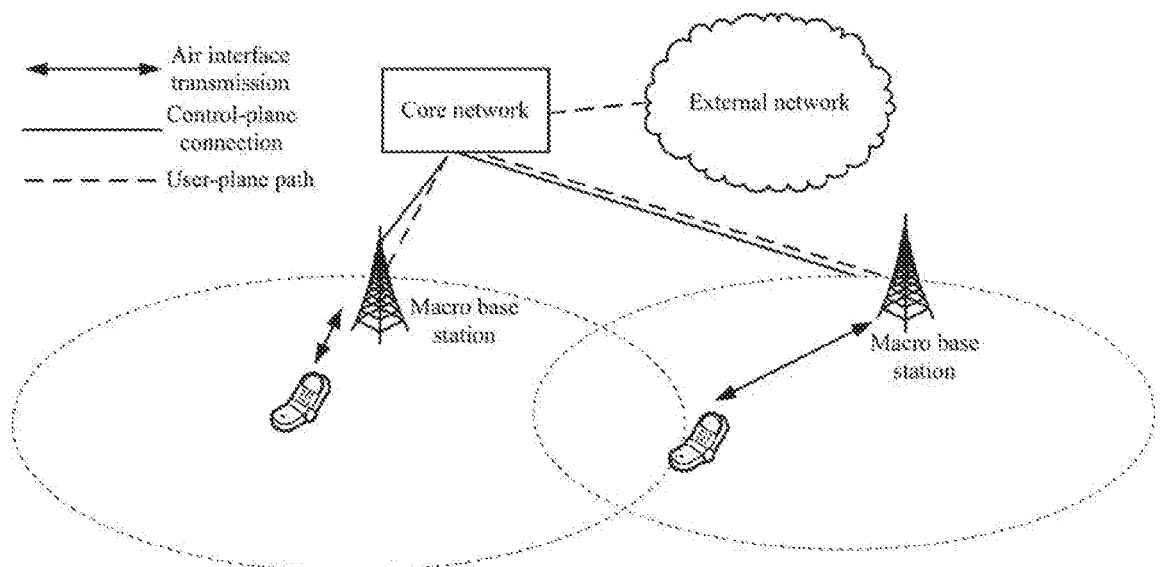
FIG. 1 is a schematic architectural diagram of a cellular network in the related art.
Figure 2:
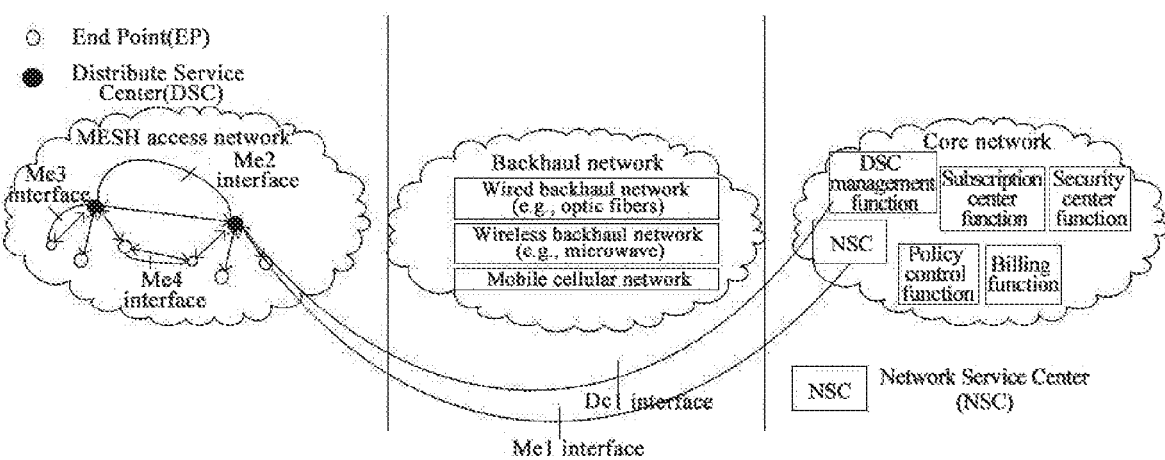
FIG. 2 is a schematic structural diagram of a wireless communication system according to an embodiment of the invention.

FIG. 2 is a schematic structural diagram of a wireless communication system, and as illustrated, the wireless communication system includes an MESH access network, a backhaul network, and a core network, where the MESH access network is connected with the core network through the backhaul network.

A MESH network supports multiple hops via an air interface, direct communication between devices via an air interface, and other characteristics The MESH access network in embodiments of the invention further supports the self-organized and infrastructureless characteristics in addition to the characteristics of the traditional MESH network.

The backhaul network includes a wired backhaul network, a wireless backhaul network, and a mobile cellular backhaul network.

The core network includes various special and general servers, data center, router and the like and is in charge of signing management, user identification, authentication, strategy control, accounting management, business management and the like for various accessing devices.

The MESH access network primarily provides services to a Machine-Type Communication (MTC) access device, where a sensor (e.g., a temperature sensor, a pressure sensor, a camera, etc.) can be bound with an endpoint, or an actuator (e.g., an accelerator, a brake, a steering device, a mechanical arm, etc.) can be bound with an endpoint, or a physical entity (e.g., a vehicle, a bicycle, a helmet, glasses, a smart watch, an unmanned aircraft, etc.) can be bound with an endpoint.

Firstly, respective interfaces as illustrated will be described below before the particular system architecture is described.

A Me1 interface is an interface established between a DSC and an NSC.

A Me2 interface is an interface established between a DSC and another DSC.

A Me3 interface is an interface established between a DSC and an EP (End Point).

A Me4 interface is an interface established between an EP and another EP.

A Dc1 interface is an interface established between a DSC and a core network DSC management functional device.

Here the MESH access network includes at least one DSC and at least one EP, and the core network includes at least one NSC.

The respective entities will be described below respectively.

1. End Point (EP)

The EP is an MTC accessing device or a wearable device capable of communication, which is provided with a data transmission service by accessing a "cluster". The EP can be bound with a specific physical device, e.g., various sensors, various actuators, an accelerator, a brake, a mechanical arm, an aircraft, a vehicle, a bicycle, a safety helmet, smart glasses, a smart watch, etc. The EP with different communication functions can be selected for a different specific physical device to be bound. The EP typically operates in a communication scenario with a short distance (e.g., shorter than 100m), and a low data rate (e.g., lower than 1000 bits/s). The embodiments of the invention can also be applicable to an EP operating over a long distance and at a high data rate.

2. Distributed Service Center (DSC)

The DSC is configured to transmit information about an EP in a corresponding cluster with the core network over the backhaul network, where the DSC is connected with each EP in the corresponding cluster. The DSC can be configured as a function onto various devices including a mobile end device, a base station device, a server device, or other hardware devices.

The DSC and the surrounding endpoints connected with the DSC constitute a cluster.

The DSC is responsible for managing and maintaining the cluster. Optionally the DSC manages the EPs in the corresponding cluster, coordinates communication with another adjacent cluster, and manages interference.

If the MESH access network shares a wireless resource with another wireless network, then the DSC may further coordinate interference with a radio resource control entity in a heterogeneous system which is adjacent or in the same coverage area and communication with the heterogeneous system across the systems. For example, the DSC can notify a surrounding DSC or LSC of time or frequency information of a radio resource allocated for "intra-cluster communication".

Correspondingly the surrounding DSC or LSC is avoided from communicating at the same time or frequency.

The DSC can further notify the surrounding DSC or LSC of interference information measured by the DSC, or one or more EPs in the cluster; and correspondingly if the surrounding DSC or LSC determine interference thereof to communication in another cluster or a "local access network", then it may lower the interference by lowering transmit power thereof or otherwise.

In order to manage a service layer and the cluster members, the DSC is responsible for participating in maintaining a list of members, verifying the identities of the cluster members, and participating in maintaining device types and service demands associated with the endpoints.

At the MESH access network layer, the DSC operates as a control point of the cluster, and is also responsible for coordinating communication with another adjacent cluster, and managing interference therewith.

In order to coordinate across the systems, if the MESH access network shares a radio resource with another wireless network (e.g., a cellular network), then the DSC may be further responsible for coordinating interference with a radio resource control entity in a heterogeneous system which is adjacent or in the same coverage area, and communication with the heterogeneous system across the systems (for example, the DSC is responsible for coordinating a base station to coordinate interference).

In summary, the DSC primarily constitutes a cluster together with the surrounding endpoint-type terminals, and the DSC is responsible for managing the "cluster". The DSC supports software and hardware decoupling, and software configurable functions. The DSC is responsible for controlling an access of an EP-type terminal, and the DSC needs to verify the identity of the accessing terminal. Since a cluster-based management strategy is applied to the core network, the DSC is responsible for report information about the cluster managed by the DSC to the core network, where the information about the cluster includes information about the number of members in the cluster managed by the DSC, and information about a service activated in the cluster managed by the DSC.

3. Network Service Center (NSC)

The NSC is responsible for terminating a control-plane interface of the access network to the core network, and the NSC supports the software and hardware decoupling and software configurable functions, and participates in managing MTC-like terminals (EPs). The Network Service Center (NSC) supports the software and hardware decoupling and software configurable functions. A plurality of DSCs in the distributed dynamic network can establish a Me1 interface with the NSC optionally as follows.

The NSC is configured to transmit information about the DSCs received through the backhaul network to the core network. Stated otherwise, the connectivity managing NSC is responsible for terminating a control-plane connection of the MESH access network to the core network.

As for network-layer security, the NSC is responsible for verifying the identities of the DSCs, and establishing a secured tunnel.

Optionally the NSC can verify identities of the DSCs, and establish a secured tunnel for transmitting data through the backhaul network between the DSCs after they pass the verification. For example, the NSC verifies identities of the DSCs in a certificate mechanism, and establishes an IPsec secured channel to thereby guarantee the security of the Me1 interface.

The NSC can manage the EPs and specific accessing devices connected with the DSCs at the service and identity layers.

The NSC is responsible for handling control-plane signaling received from the MESH access network and the cellular access network by verifying the identities of the EPs and the devices, verifying and activating the device types and the service types associated with the EPs, activating sessions to a specific external network for the devices, etc.

For example, the NSC is responsible for managing the state information of the EPs, including tracking management (information about the "cluster" currently accessed by the EPs), session management (a service currently activated for an EP), and identity management (e.g., the device types and the service types to which the EPs subscribe).

In an optional implementation, the NSC is a centralized control unit, and the DSCs are distributed control units.

As for the management aspect, the DSCs are responsible for controlling local functions for which a short delay is required, and the NSC is responsible for controlling a global function for which a short delay is not required, and high security is required.

One or more NSCs can be deployed in the core network, and the different NSCs are peers of each other.

4. DSC Management Function

The device performing this function is located in the core network, and responsible for authenticating an authorized device, controlling the authorized device to start a DSC operating mode, managing the authorized device in which the Distributed Service Center (DSC) function is enabled, configuring the authorized device with necessary configuration parameters for the authorized device to operate in the DSC mode, and collecting state information of the "cluster" from the DSC after the DSC is started.

The technical solution according to embodiments of the invention is characterized in the following aspects.

The Authorized Device (AD) with the Distributed Service Center (DSC) function subscribes in advance with an operator for authorization of the DSC function, and after the AD is started, it firstly initiates a registration procedure with the core network; and the core network registering the AD verifies the identity of the AD, and authorizes the AD according to the subscription information to enable the DSC function.

The authorized device configured with the DSC function, and the MTC-like accessing terminals (EPs) constitute a dynamic network in a self-organized manner, the DSC is responsible for managing the network, and the AD configured with the DSC function manages an access of the MTC-like accessing terminals (EPs). After the DSC is started, the DSC establishes a control-plane interface, i.e., a Me1 interface (the Me1 interface is used for verifying the identities of the EPs with the assistance of the core network, and for the DSC to report the state information about the "cluster" to the core network) with the core network NSC, and the NSC verifies the identity of the DSC during establishing the interface. After the DSC is started, the DSC transmits the network information, the cluster information, the service information, etc., by broadcasting the information among the cluster members (EPs) via an air interface.

After the DSC is started, the DSC discovers an adjacent "cluster" by detecting, or receiving a report from a cluster member, and establishes a Me2 interface with a DSC in the adjacent cluster to perform functions of coordinating radio resources, and avoiding interference.

Embodiments of the invention will be described below.

The embodiments of the invention at the DSC, the EP, and the NSC at the core network side will be described below respectively, and then an embodiment in which all of them communicate in cooperation will be described, in the following stages: the AD is registered with the network and enables the DSC function; the DSC establishes a Me1 interface connection with the core network NSC; the DSC transmits system broadcast information via an air interface; the DSC discovers an adjacent DSC (adjacent cluster) directly via the air interface and establishes a Me2 interface connection; the DSC discovers an adjacent DSC (adjacent cluster) indirectly through a cluster member EP and establishes an Me2 interface; and the DSC notifies the DSC management functional device at the core network side of state information of the "cluster", so that the embodiment in which the DSC, the EP, and the core network NSC manage in cooperation an MTC-like terminal over a "distributed dynamic network" will also be described in connection with the embodiments of the DSC, the EP, and the core network NSC in the respective contexts.

Apparently although the DSC, the EP, and the NSC at the core network side are described together, they may not necessarily cooperate with each other, but in fact, if they operate separately, then respective problems of the DSC, the EP, and the NSC at the core network side will also be addressed, although they can operate in cooperation for a better technical effect.

Figure 3:
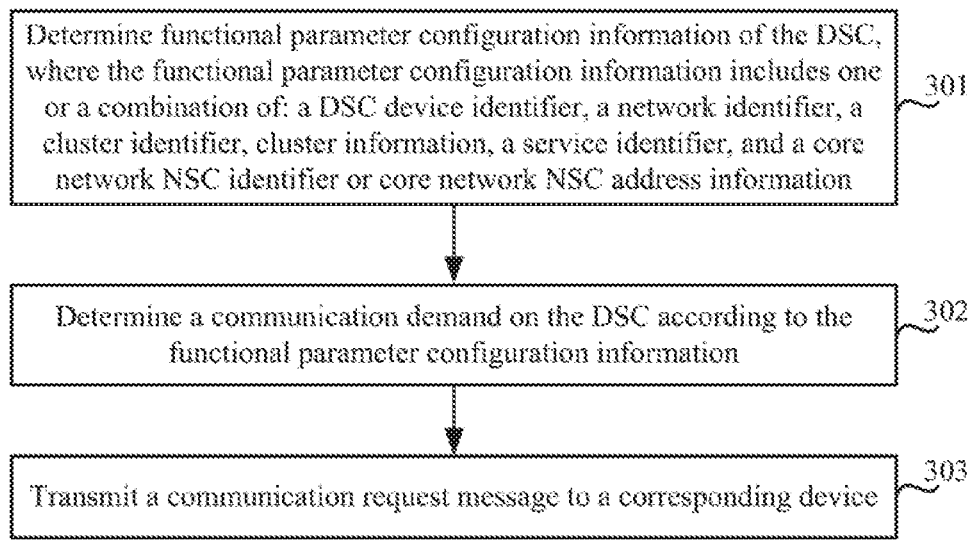
FIG. 3 is a schematic flow chart of a communication method performed on a DSC according to an embodiment of the invention.

FIG. 3 is a schematic flow chart of a communication method performed on a DSC, and as illustrated, the method can include the following steps.

The step 301 is to determine functional parameter configuration information of the DSC, where the functional parameter configuration information includes one or a combination of: a DSC device identifier, a network identifier, a cluster identifier, cluster information, a service identifier, and a core network NSC identifier or core network NSC address information.

The step 302 is to determine a communication demand on the DSC according to the functional parameter configuration information.

The step 303 is to transmit a communication request message to a corresponding device.

Figure 4:
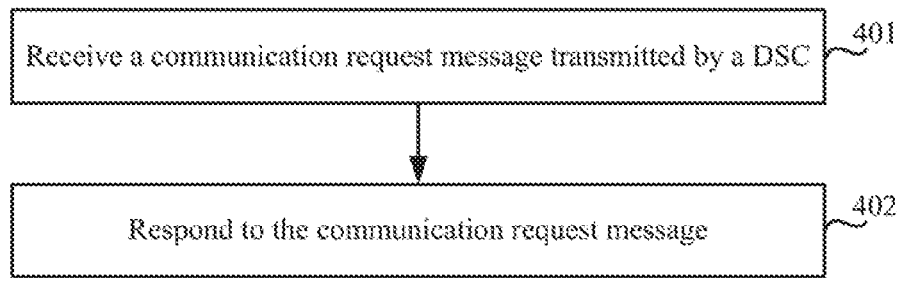
FIG. 4 is a schematic flow chart of a communication method performed on a core network according to an embodiment of the invention.

FIG. 4 is a schematic flow chart of a communication method performed on a core network, and as illustrated, the method can include the following steps.

The step 401 is to receive a communication request message transmitted by a DSC.

The step 402 is to respond to the communication request message.

Figure 5:
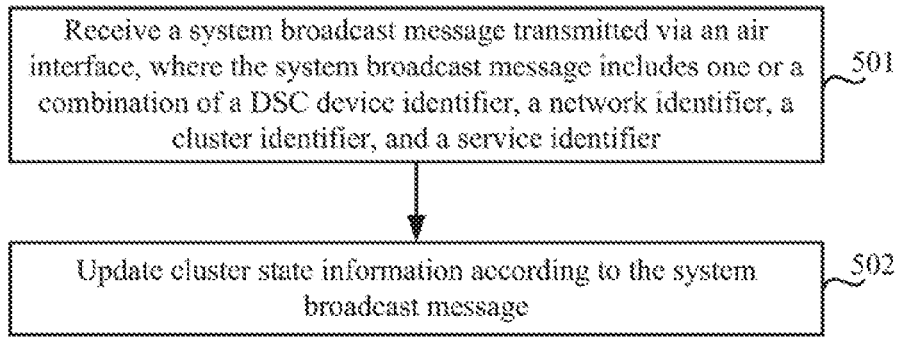
FIG. 5 is a schematic flow chart of a communication method performed on an EP according to an embodiment of the invention.

FIG. 5 is a schematic flow chart of a communication method performed on an EP, and as illustrated, the method can include the following steps.

The step 501 is to receive a system broadcast message transmitted via an air interface, where the system broadcast message includes one or a combination of a DSC device identifier, a network identifier, a cluster identifier, and a service identifier.

The step 502 is to update cluster state information according to the system broadcast message.

First Embodiment

The AD will be registered with the network, and enable the DSC function, as described in this embodiment, and in this flow, the DSC and the core network will operate respectively as follows.

1. On the AD (DSC)

After the AD is connected with the core network, the AD transmits a service authorization request message to a device managing the DSC on the core network, where the service authorization request message carries identification information and identity verification information of the DSC.

The AD receives a service authorization response message transmitted by the device managing the DSC, where the service authorization response message carries the functional parameter configuration information.

2. At the Core Network Side

A communication request message transmitted by the DSC is the service authorization request message transmitted by the DSC connected with the core network, where the service authorization request message carries the identification information and the identity verification information of the DSC.

A response is made to the communication request message as follows.

The functional parameter configuration information of the DSC is determined according to the identification information and the identity verification information of the DSC, and subscription information, where the functional parameter configuration information includes one or a combination of: a DSC device identifier, a network identifier, a cluster identifier, cluster information, a service identifier, and a core network NSC identifier and core network NSC address information.

A service authorization response message is transmitted to the DSC, where the service authorization response message carries the functional parameter configuration information.

In this embodiment, the AD establishes a signaling connection with the DSC control function of the core network through an IP connectivity service provided by the cellular network or the fixed backhaul network, and the DSC control function authorizes the AD according to the subscription condition of the AD to start the DSC operating mode.

It shall be noted that the DSC function has been available on the AD, so the AD has been represented as "AD (DSC)", and the AD is authorized by the device controlling the DSC function in the core network to enable the DSC function, that is, the AD can operate with the DSC function to manage an MTC-like terminal over the "distributed dynamic network". For the sake of a convenient description, the AD may also be referred to as a DSC in the description.

An example thereof will be further described below.

Figure 6:
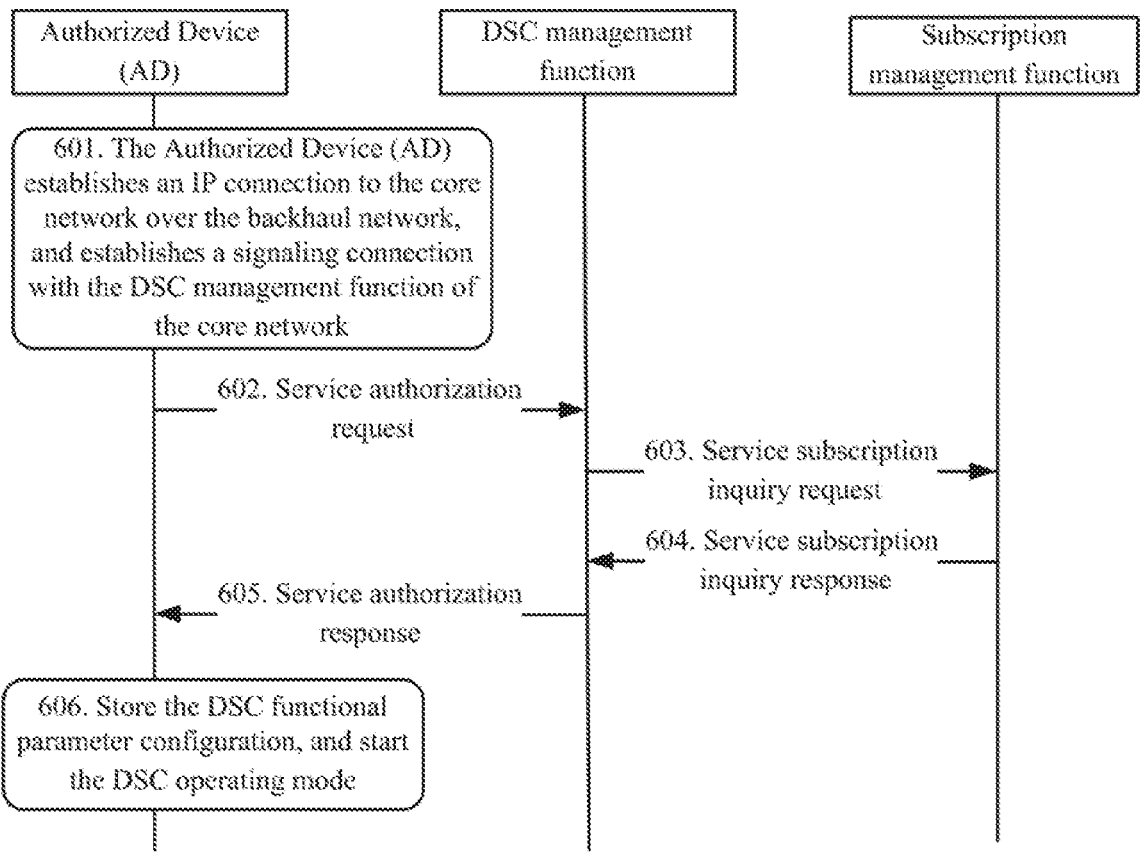
FIG. 6 is a schematic flow chart of an AD being registered with a network, and enabling a DSC function according to an embodiment of the invention.

FIG. 6 is a schematic flow chart of the AD being registered with the network, and enabling the DSC function, and as illustrated, the flow can be as follows.

In the step 601, the AD establishes an IP connection to the core network through the backhaul network, and a signaling connection with the DSC management function of the core network.

In the step 602, the AD transmits a service authorization request to the DSC management function, where the service authorization request carries a device ID of the authorized device, and identity verification information of the authorized device.

In the step 603, the DSC management function transmits a service inquiry request to a subscription management function, where the service inquiry request carries the ID and the identity verification information of the authorized device, and a DSC indicator of a service type.

In the step 604, the subscription management function makes an inquiry of whether the device has subscribed with the DSC function, according to pre-stored subscription information, and the device ID, and if there is still valid authorization for the DSC function with which the device has subscribed, then the subscription management function will transmit a service subscription inquiry response to the DSC management function, where the service subscription inquiry response carries the device identifier, and a DSC function enabling instruction.

In the step 605, the DSC management function transmits a DSC functional parameter configuration and the DSC function enabling instruction to the authorized device in a service authorization response message, where the DSC functional parameter configuration includes a network identifier, a cluster identifier, a service identifier, and other information, and also an identifier of the core network NSC, or address information of the core network NSC, so that the DSC subsequently establishes a Me1 interface to the NSC.

In the step 606, the AD stores the DSC functional parameter configuration, and starts the DSC operating mode.

Second Embodiment

The DSC establishes a Me1 interface with the core network NSC as described in this embodiment, and in this flow, the DSC and the core network will operate respectively as follows.

1. On the DSC

If the functional parameter configuration information includes the identifier of the core network NSC, or the address information of the core network NSC, then the DSC will determine according to the functional parameter configuration information that a communication demand on the DSC is to establish a communication connection via a Me1 interface, a communication request message transmitted to the NSC is a Me1 interface establishment request message.

Furthermore the DSC will store state information of successful Me1 interface establishment upon reception of a Me1 interface establishment complete message returned by the NSC.

2. At the Core Network Side

The communication request message transmitted by the DSC is the Me1 interface establishment request message.

A response is made to the communication request message by returning the Me1 interface establishment complete message.

In this embodiment, before the DSC provides an EP device with access and data transmission services, the DSC firstly establishes a Me1 interface with the core network NSC (e.g., the core network NSC needs to participate via the Me1 interface in controlling attachment and service established of sonic type of EP). The DSC being started can obtain the identifier of the NSC, or the address information of the core network NSC from the DSC management function of the core network, where the information is used for the DSC to establish a control-plane interface between the DSC and the NSC.

An example thereof will be further described below.

Figure 7:
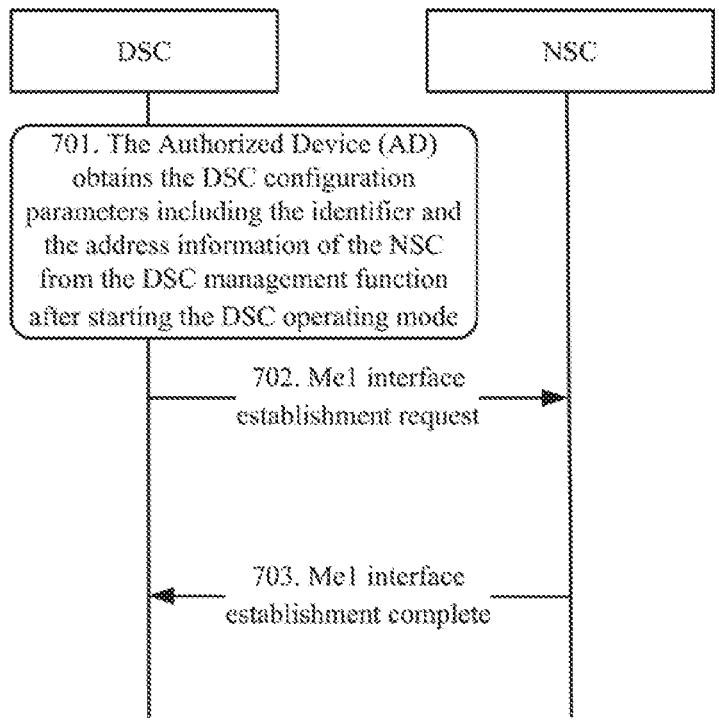
FIG. 7 is a schematic flow chart of a DSC establishing a Me1 interface with a core network NSC according to an embodiment of the invention.

FIG. 7 is a schematic flow chart of a DSC establishing a Me1 interface with a core network NSC, and as illustrated, the flow can be as follows.

In the step 701, the AD (DSC) obtains DSC configuration parameters including the identifier of the NSC, or the address information of the NSC from the DSC management function before starting the DSC operating mode.

In the step 702, the DSC initiates a Me1 interface establishment request message to the NSC according to the address information of the target NSC, where the Me1 interface establishment request message carries the device identifier of the DSC, the network identifier, the cluster identifier, the service identifier, and the identity verification information of the DSC.

In the step 703, the NSC verifies the identity of the DSC according to the identity verification information received from the DSC, and stores state information of successful Me1 interface establishment and transmits a Me1 interface establishment complete message to the DSC after finishing the identity verification, where the Me1 interface establishment complete message carries the device ID of the NSC, and the identity verification information of the NSC. The DSC verifies the identity of the NSC according to the identity verification information received from the NSC, and stores the Me1 interface establishment complete message after passing the identity verification.

Third Embodiment

The DSC will transmit system broadcast information, which can carry network information, cluster information, and service information, via an air interface as described in this embodiment, and in this flow, the DSC and the EP will operate respectively as follows.

1. On the DSC.

If the functional parameter configuration information includes the device identifier of the DSC, the network identifier, the cluster identifier, and the service identifier, then the DSC will determine according to the functional parameter configuration information that a communication demand on the DSC is to broadcast in the cluster the system information to be known to the devices in the cluster.

Here a communication request message transmitted to a corresponding device is a system broadcast message transmitted via an air interface, where the system broadcast message includes one or a combination of the identifier of the DSC, the network identifier, the cluster identifier, and the service identifier.

In an implementation, the system broadcast message can further include forward information indicating whether the system broadcast message needs to be forwarded by the receiving device.

2. On the EP.

The EP receives the system broadcast message transmitted via the air interface, where the system broadcast message includes one or a combination of the identifier of the DSC, the network identifier, the cluster identifier, and the service identifier.

The EP updates state information of the cluster according to the system broadcast message transmitted via the air interface.

In an implementation, the system broadcast message can further include the forward information indicating whether the system broadcast message needs to be forwarded by the receiving device.

Furthermore the EP forwards the system broadcast message to another EP via the air interface upon determining according to the forward information that the system broadcast message needs to be forwarded.

In an optional implementation, the forward information can include the largest number N of hops, and an indicator M of the number of hops, where M and N are natural numbers; and If M is less than N, then the EP will determine that the system broadcast message needs to be forwarded, and increase M by 1 while forwarding it; and if M is equal to N, then the EP will determine that the system broadcast message does not need to be forwarded.

In this embodiment, the system broadcast information is transmitted via the air interface so that on one hand, a new EP device (EP device newly accessing the network) selects the network and the "cluster", and on the other hand, the air interface broadcast information can assist adjacent DSCs (or adjacent clusters) in discovering each other. Furthermore since the DSC is responsible for maintaining a list of cluster members, information about the list of cluster members carried in the system broadcast information can be used for the EP to discover another EP member in the cluster.

Since there is a limited transmission range of the DSC device, the coverage area of the cluster needs to be extended in a multi-hop manner, so multi-hop transmission can be supported using the air interface system broadcast information in the cluster controlled by the DSC, that is, those EP members in the cluster, which receiving the system broadcast message transmitted by the DSC can forward the system broadcast message, and the DSC can control the largest number of hops over which the system broadcast message is forwarded via the air interface, using the parameter "the largest number of hops".

An example thereof will be further described below.

Figure 8:
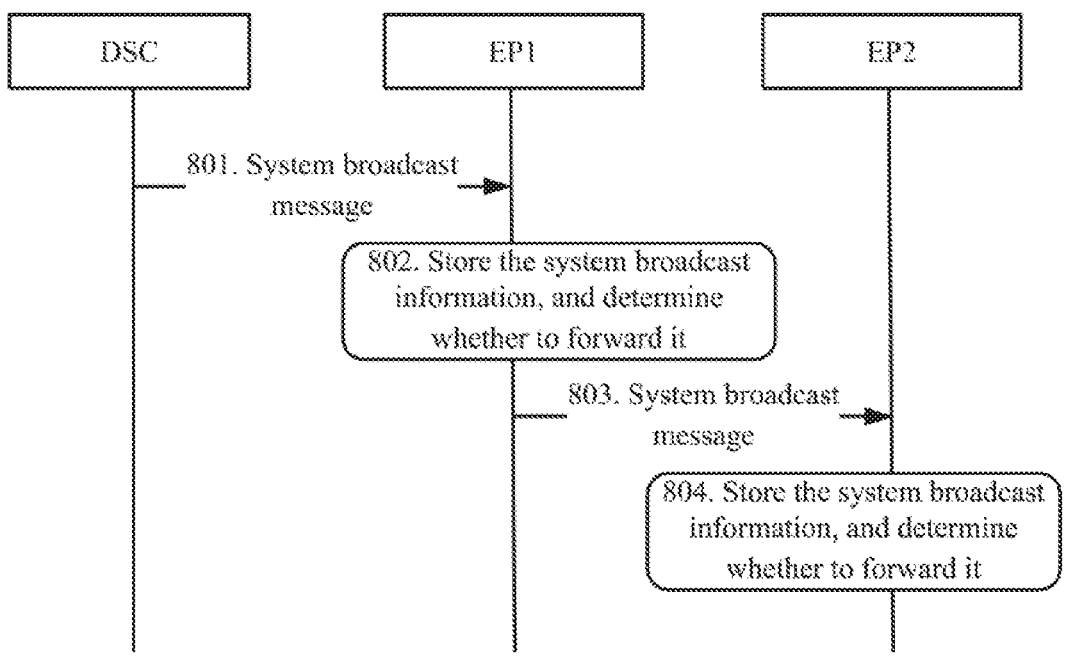
FIG. 8 is a schematic flow chart of a DSC transmitting system broadcast information via an air interface according to an embodiment of the invention.

FIG. 8 is a schematic flow chart of the DSC transmitting system broadcast information via an air interface, and as illustrated, the flow can be as follows.

In the step 801, the DSC transmits a system broadcast message via an air interface, where the system broadcast message carries the device identifier of the DSC, the network identifier, the cluster identifier, the service identifier, information about the largest number of hops, the indicator of the number of hops which is set to 1, and the information about the list of cluster members including information about a list of currently accessing EPs in the cluster.

In the step 802, an EP1 in the cluster updates its stored state information of the cluster upon reception of the system broadcast information transmitted by the currently serving DSC in the cluster via the air interface, and determines whether to forward the system broadcast information according to the largest number of hops and the indicator of the number of hops, and if the indicator of the number of hops does not exceed the largest number of hops, then the EP1 will forward the system broadcast information.

In the step 803, the EP1 transmits system broadcast information via the air interface, where the system broadcast information carrying the device identifier of the EP, the device identifier of the DSC, the network identifier, the cluster identifier, the service identifier, the largest number of hops, the indicator of the number of hops (2), and the information about the list of cluster members; and the indicator of the number of hops is the original number of hops plus 1.

In the step 804, a cluster member EP2 updates its stored state information of the cluster upon reception of the system broadcast information transmitted by the currently serving DSC in the cluster via the air interface, and determines whether to forward the system broadcast information, according to the largest number of hops, and the indicator of the number of hops, and if the indicator of the number of hops does not exceed the largest number of hops, then the EP1 will forward the system broadcast information.

Fourth Embodiment

The DSC will discover an adjacent DSC (adjacent cluster) directly via an air interface, and establish a Me2 interface connection, as described in this embodiment, where as referred to in this embodiment, DSC1 refers to a DSC broadcasting a system broadcast message, and DSC2 refers to a DSC initiating a Me2 interface connection upon reception of the system broadcast message, so the DSC1 and the DSC2 operate respectively as follows in this flow.

1. On the DSC1

The DSC1 receives a Me2 interface establishment request message transmitted by the other DSC2, where the Me2 interface establishment request message carries one or a combination of the device identifier of the DSC1, the identifier of the network, the identifier of the cluster, and the identifier of a service provided by the DSC1.

The DSC1 transmits a Me2 interface establishment complete message to the other DSC2.

In an implementation, information carried in the Me2 interface establishment complete message is obtained from a system broadcast message transmitted by the DSC1.

2. On the DSC2

The DSC2 receives the system broadcast message transmitted by the other DSC1, where the system broadcast message includes one or a combination of the device identifier of the other DSC1, the network identifier of the other DSC1, the cluster identifier of the other DSC1, and the service identifier of the other DSC1.

The DSC2 transmits the Me2 interface establishment request message to the other DSC1, where the Me2 interface establishment request message includes one or a combination of the device identifier of the other DSC1, the network identifier of the other DSC1, the cluster identifier of the other DSC1, and the service identifier of the other DSC1.

The DSC2 receives the Me2 interface establishment complete message returned by the other DSC1.

An example thereof will be further described below.

Figure 9:
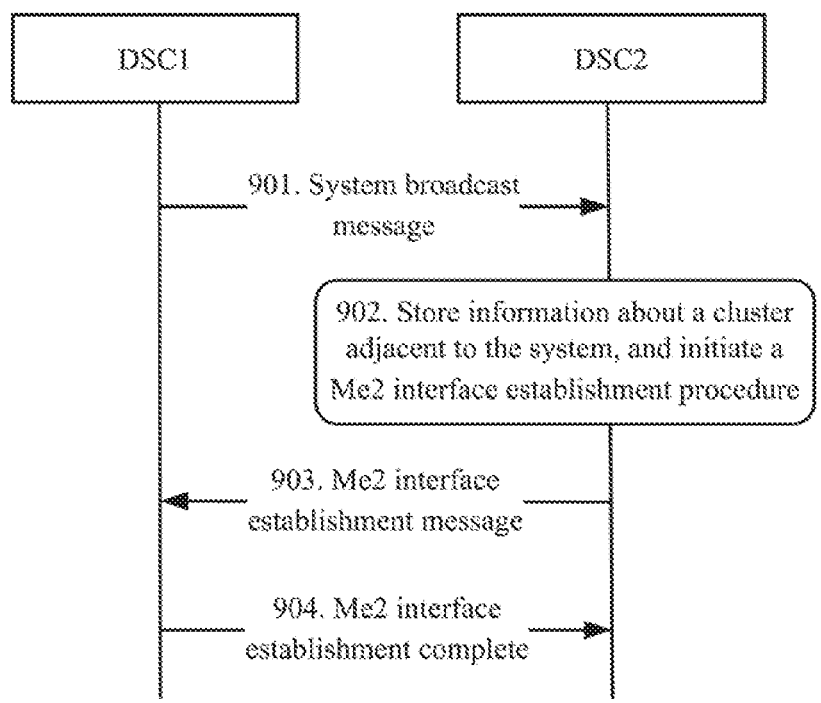
FIG. 9 is a schematic flow chart of a DSC discovering an adjacent DSC (adjacent cluster) directly through the air interface, and establishing a Me2 interface connection according to an embodiment of the invention.

FIG. 9 is a schematic flow chart of the DSC discovering an adjacent DSC (adjacent cluster) directly via an air interface, and establishing a Me2 interface connection, and as illustrated, the flow can be as follows.

In the step 901, the DSC1 transmits a system broadcast message via an air interface, where the system broadcast message carries the device identifier of the DSC, the network identifier, the cluster identifier, the service identifier, information about the largest number of hops, the indicator of the number of hops which is set to 1, and information about the list of cluster members including information about the list of currently accessing EPs in the cluster.

In the step 902, the DSC2 receiving the system message transmitted directly from the adjacent DSC1 stores information about the cluster managed by the DSC1, and initiates a Me2 interface establishment procedure for the DSC1.

In the step 903, the DSC2 transmits a Me2 interface establishment message to the DSC1, where the Me2 interface establishment message carries the device identifier of the source SC, the identifier of the source network, the identifier of the source cluster, the identifier of the source service, and the identifier of the target DSC.

In the step 904, the DSC1 admitting establishment of a Me2 interface with the DSC2 transmits a Me2 interface establishment complete message to the DSC2.

Fifth Embodiment

The DSC will discover an adjacent DSC (adjacent cluster) indirectly through a cluster member EP, and establish a Me2 interface connection, as described in this embodiment, where as referred to in this embodiment, DSC1 refers to a DSC broadcasting a system broadcast message, DSC2 refers to a DSC initiating a Me2 interface connection upon reception of the system broadcast message, EP1 refers to an EP served by the DSC1, and EP2 refers to an EP served by the DSC2 where the EP1 forwards the system broadcast message to the EP2 according to forward information (including the indicator of the number of hops, and the largest number of hops in the example) upon reception of the system broadcast message, and the EP2 further forwards the system broadcast message to the DSC2 according to the forward information (including the indicator of the number of hops, and the largest number of hops in the example), so the DSC1, the EP1, the EP2, and the DSC2 operate respectively as follows.

1. On the DSC1

The DSC1 receives a Me2 interface establishment request message transmitted from the other DSC2, where the Me2 interface establishment request message carries one or combination of the device identifier of the DSC1, the identifier of the network, the identifier of the cluster, and the identifier of a service provided by the DSC1.

The DSC1 returns a Me2 interface establishment complete message to the other DSC2.

2. On the EP1

The EP1 receives a system broadcast message broadcasted by the DSC1, determines that the system broadcast message needs to be forwarded, according to the forward information, and forwards the system broadcast message.

3. On the EP2

The EP2 receives the system broadcast message broadcasted by the EP1, determines that the system broadcast message needs to be forwarded, according to the forward information, and forwards the system broadcast message.

4. On the DSC2

The DSC2 receives the system broadcast message transmitted by the other DSC1, where the system broadcast message includes one or a combination of the device identifier of the other DSC1, the network identifier of the other DSC1, the cluster identifier of the other DSC1, and the service identifier of the other DSC1.

The DSC2 transmits the Me2 interface establishment request message to the other DSC1, where the Me2 interface establishment request message carries includes one or a combination of the device identifier of the other DSC1, the network identifier of the other DSC1, the cluster identifier of the other DSC1, and the service identifier of the other DSC1.

The DSC2 receives the Me2 interface establishment complete message returned by the other DSC1.

In an implementation, the system broadcast message transmitted by the other DSC is forwarded by the EP. For example, the system broadcast message transmitted by the other DSC1 is forwarded by the EP1 and the EP2 in this example.

In this embodiment, it can be determined whether to forward the system broadcast message, according to the indicator of the number of hops and the largest number of hops in the forward information as described in the third embodiment.

An example thereof will be further described below.

Figure 10:
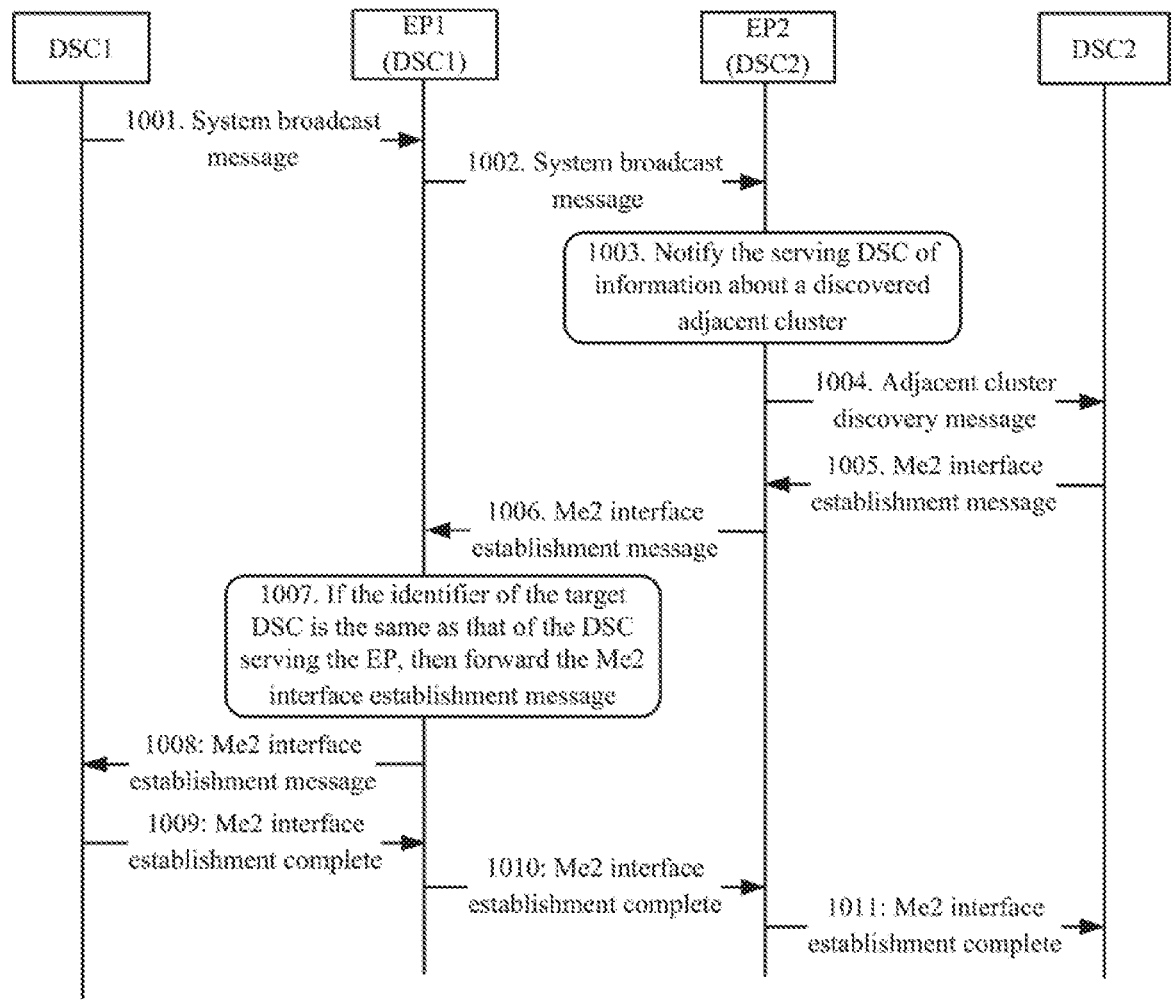
FIG. 10 is a schematic flow chart of a DSC discovering an adjacent DSC (adjacent cluster) indirectly through a cluster member EP, and establishing a Me2 interface connection.

FIG. 10 is a schematic flow chart of the DSC discovering an adjacent DSC (adjacent cluster) indirectly through a cluster member EP, and establishing a Me2 interface connection, and as illustrated, the flow can be as follows.

In the step 1001, the DSC1 transmits a system broadcast message via an air interface, where the system broadcast message carries the device identifier of the DSC, the network identifier, the cluster identifier, the service identifier, information about the largest number of hops, the indicator of the number of hops which is set to 1, and the information about the list of cluster members including information about a list of currently accessing EPs in the cluster.

In the step 1002, the member EP1 in the cluster of the DSC1, updates its stored state information of the cluster upon reception of the system broadcast information transmitted by the currently serving DSC in the cluster via the air interface, and determines whether to forward the system broadcast information, according to the largest number of hops and the indicator of the number of hops, and if the indicator of the number of hops does not exceed the largest number of hops, then the EP1 will forward the system broadcast information.

In the step 1003, the member EP2 in the cluster of the DSC2 decides to notify the DSC2 of an event of the adjacent cluster (DSC1) discovered by the EP2, upon reception of the system broadcast message transmitted by the EP1.

In the step 1004, the EP2 transmits an adjacent cluster discovery message to the DSC2, where the adjacent cluster discovery message carries the device identifier of the adjacent DSC, the identifier of the adjacent network, the identifier of the adjacent cluster, and the identifier of the adjacent service.

In the step 1005, the DSC2 transmits a Me2 interface establishment message carrying the device identifier of the source DSC, the identifier of the source network, the identifier of the source cluster, the identifier of the source service, and the identifier of the target DSC.

In the step 1006, the EP2 forwards the Me2 interface establishment message transmitted by the DSC2, via the air interface upon reception of the message.

In the step 1007, after receiving the Me2 interface establishment message transmitted by the EP2, the EP1 determines whether the message is intended for the DSC serving the EP1, according to the identifier of the target DSC carried in the message, and if so, then the EP1 will forward the Me2 interface establishment message.

In the step 1008, the EP1 transmits a Me2 interface establishment request message.

In the step 1009, the DSC1 receives the Me2 interface establishment request message, and if the DSC1 accepts the Me2 interface establishment request, then the DSC1 will transmit a Me2 interface establishment complete message carrying the device identifier of the source DSC, and the identifier of the target DSC.

In the step 1010, the EP1 forwards the Me2 interface establishment complete message upon reception thereof.

In the step 1011, after receiving the Me2 interface establishment complete message via the air interface, the EP2 determines whether the message is intended for the DSC serving the EP2, according to the device identifier of the target DSC carried in the message, and if so, then the EP2 will forward the message via the air interface.

Sixth Embodiment

The DSC will notify the DSC management functional device of state information of the "cluster" as described in this embodiment, and in this flow, the DSC and the DSC management functional device of the core network will operate respectively as follows.

1. On the DSC

If the functional parameter configuration information includes cluster information, then the DSC will determine according to the functional parameter configuration information that a communication demand on the DSC is to report the cluster information to a device managing the DSC on the core network.

The DSC will transmit a cluster state report message to the device managing the DSC on the core network, where the cluster state report message carries the information about the cluster managed by the cluster.

In an implementation, following operation are further included.

If the cluster information is changed, then the DSC may further transmit a cluster state report message to the device managing the DSC on the core network, where the cluster state report message carries the changed information about the cluster.

2. At the Core Network Side

A communication request message transmitted by the DSC is the cluster state report message carrying the information about the cluster managed by the DSC.

A response is made to the communication request message by storing the information about the cluster managed by the DSC, carried in the cluster state report message.

In this embodiment, the DSC can notify the DSC management function of the core network of the cluster information in a cluster state reporting procedure periodically or in the event that the cluster information is changed.

An example thereof will be further described below.

Figure 11:
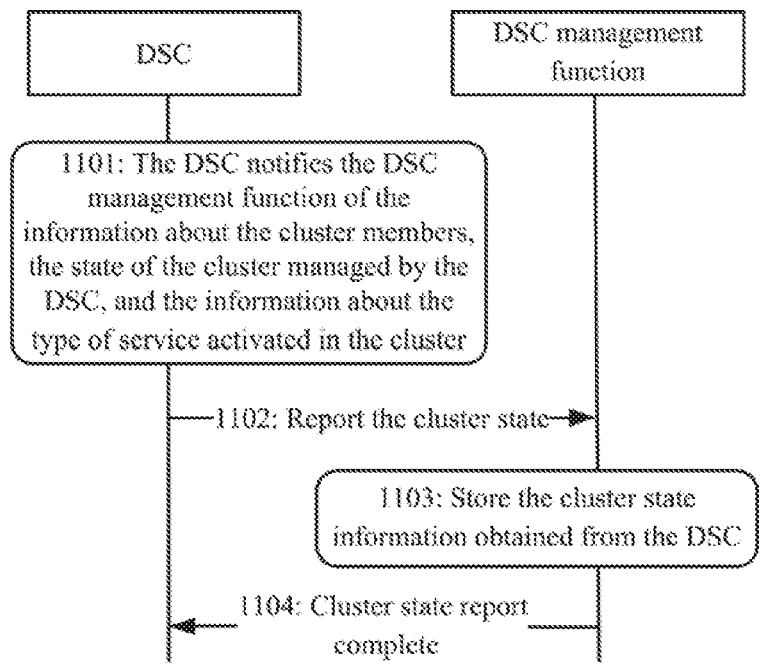
FIG. 11 is a schematic flow chart of a DSC notifying a DSC management function of "cluster" state information according to an embodiment of the invention.

FIG. 11 is a schematic flow chart of the DSC notifying the DSC management function of state information of the "cluster", and as illustrated, the flow can be as follows.

In the step 1101, after the DSC is started, the DSC notifies the DSC management function of the core network of information about the cluster managed by the DSC, where the information can optionally include information about the cluster members, information about the state of the cluster (e.g., activated or idle), and information about services activated for the members in the cluster.

In the step 1102, the DSC notifies the DSC management function of the cluster information in a cluster state report message.

In the step 1103, the DSC management function stores the state information of the cluster upon reception of the cluster state report.

In the step 1104, the DSC management function transmits a cluster state report complete message to the DSC.

Based upon the same inventive idea, embodiments of the invention further provide communication devices, and since these devices address the problem under a similar principle to the communication methods above, reference can be made to the implementations of the methods for implementations of these devices, and a repeated description thereof will be omitted here.

Figure 12:
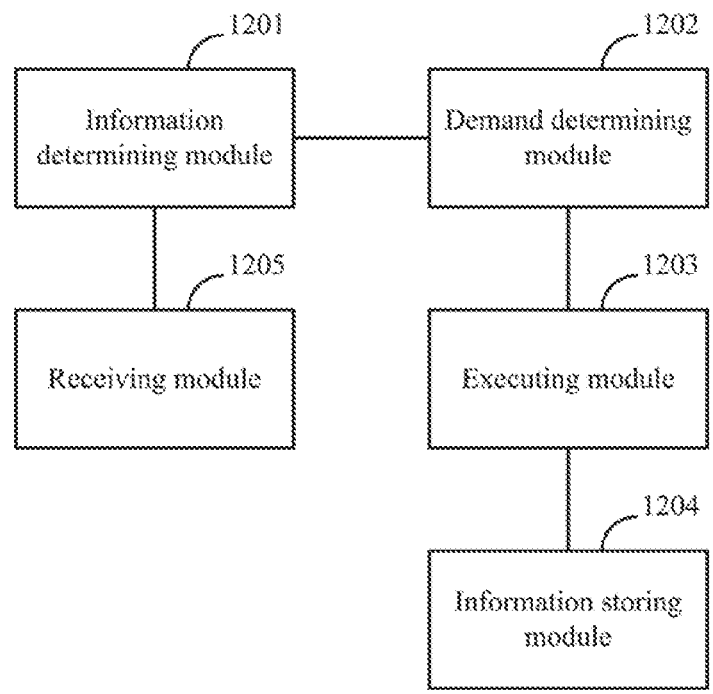
FIG. 12 is a schematic structural diagram of a communication device including a DSC function on an authorized device according to an embodiment of the invention.

FIG. 12 is a schematic structural diagram of a communication device including a DSC function on an authorized device, and as illustrated, the communication device can include follows.

An information determining module 1201 is configured to determine functional parameter configuration information of the DSC, where the functional parameter configuration information includes one or a combination of: a DSC device identifier, a network identifier, a cluster identifier, cluster information, a service identifier, and a core network NSC identifier or core network NSC address information.

A demand determining module 1202 is configured to determine a communication demand on the DSC according to the functional parameter configuration information.

An executing module 1203 is configured to transmit a communication request message to a corresponding device.

In an implementation, the functional parameter configuration information includes the core network NSC identifier or the core network NSC address information;

The demand determining module is further configured to determine according to the functional parameter configuration information that the communication demand on the DSC is to establish a Me1 interface communication connection.

The executing module is further configured to transmit a Me1 interface establishment request message to the NSC.

The communication device further includes follows.

An information storage module 1204 is configured to store Me1 interface establishment success state information upon reception of a Me1 interface establishment complete message returned by the NSC.

In an implementation, the functional parameter configuration information includes the DSC device identifier, the network identifier, the cluster identifier, and the service identifier.

The demand determining module is further configured to determine according to the functional parameter configuration information that the communication demand on the DSC is to broadcast in the cluster system information to be known to the devices in the cluster.

The executing module is further configured to broadcast a system broadcast message via an air interface, where the system broadcast message includes one or a combination of the DSC device identifier, the network identifier, the cluster identifier, and the service identifier.

In an implementation, the executing module is further configured to transmit the system broadcast message including forward information indicating whether the system broadcast message needs to be forwarded by the receiving device.

In an implementation, the communication device further includes follows.

A receiving module 1205 is configured to receive a Me2 interface establishment request message transmitted by another DSC, where the Me2 interface establishment request message carries one or a combination of the device identifier of the current DSC, the identifier of the current network, the identifier of the current cluster, and the identifier of a service provided by the current DSC.

The executing module is further configured to return a Me2 interface establishment complete message to the other DSC.

In an implementation, the communication device further includes follows:

A receiving module 1205 is configured to receive a system broadcast message transmitted by another DSC, where the system broadcast message includes one or a combination of a device identifier of the other DSC, a network identifier of the other DSC, a cluster identifier of the other DSC, and a service identifier of the other DSC.

The executing module is further configured to transmit a Me2 interface establishment request message to the other DSC, where the Me2 interface establishment request message includes one or a combination of the device identifier of the other DSC, the network identifier of the other DSC, the cluster identifier of the other DSC, and the service identifier of the other DSC.

The receiving module is further configured to receive a Me2 interface establishment complete message returned by the other DSC.

In an implementation, the receiving module is further configured to receive a system broadcast message which is transmitted by the other DSC and then forwarded by an EP, or to receive a system broadcast message transmitted by the other DSC.

In an implementation, the functional parameter configuration information includes cluster information.

The demand determining module is further configured to determine according to the functional parameter configuration information that the communication demand on the DSC is to report the cluster information to a device managing the DSC on a core network.

The executing module is further configured to transmit a cluster state report message to the device managing the DSC on the core network, where the cluster state report message carries information about a cluster managed by the DSC.

In an implementation, the communication device further includes follows.

The executing module is further configured, if the cluster information is changed, to transmit a cluster state report message to the device managing the DSC on the core network, where the cluster state report message carries changed information about the cluster.

In an implementation, the communication device further includes follows.

The executing module is further configured to transmit a service authorization request message to a device managing the DSC on a core network after establishing a connection with the core network, where the service authorization request message carries identification information and identity verification information of the DSC.

The receiving module is further configured to receive a service authorization response message transmitted by the device managing the DSC, where the service authorization response message carries the functional parameter configuration information.

Figure 13:
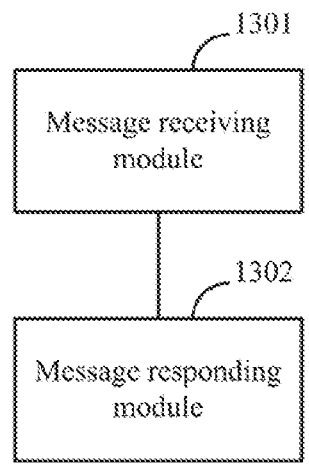
FIG. 13 is a schematic structural diagram of a communication device on a core network according to an embodiment of the invention.

FIG. 13 is a schematic structural diagram of a communication device on a core network, and as illustrated, the communication device can include follows.

A message receiving module 1301 is configured to receive a communication request message transmitted by a DSC.

A message responding module 1302 is configured to respond to the communication request message.

In an implementation, the message receiving module is further configured to receive a Me1 interface establishment request message transmitted by the DSC.

The message responding module is further configured to return a Me1 interface establishment complete message according to the communication request message.

In an implementation, the message receiving module is further configured to receive a cluster state report message transmitted by the DSC, where the cluster state report message carries information about a cluster managed by the DSC.

The message responding module is further configured to store the information about the cluster managed by the DSC, carried in the cluster state report message according to the communication request message.

In an implementation, the message receiving module is further configured to receive a service authorization request message transmitted by the DSC after establishing a connection with a core network, where the service authorization request message carries identification information and identity verification information of the DSC.

The message responding module is further configured to determine functional parameter configuration information of the DSC according to the identification information and the identity verification information of the DSC, and subscription information, and to transmit a service authorization response message to the DSC, where the service authorization response message carries the functional parameter configuration information, and the functional parameter configuration information includes one or a combination of a DSC device identifier, a network identifier, a cluster identifier, cluster information, a service identifier, and a core network NSC identifier and core network NSC address information.

Figure 14:
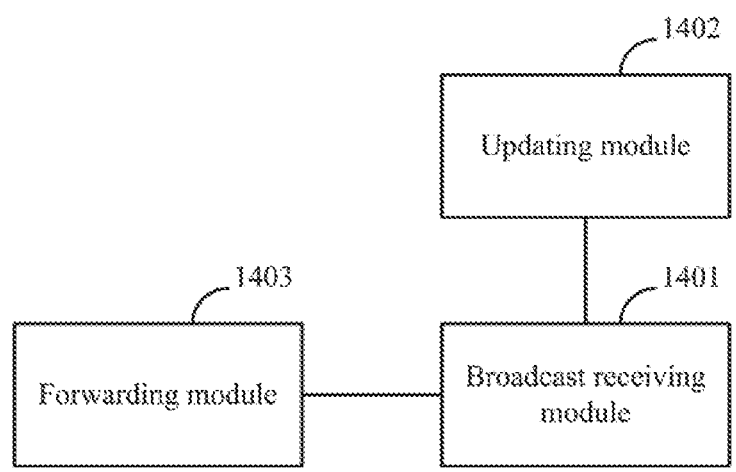
FIG. 14 is a schematic structural diagram of a communication device on an EP according to an embodiment of the invention.

FIG. 14 is a schematic structural diagram of a communication device on an EP, and as illustrated, the communication device can include follows.

A broadcast receiving module 1401 is configured to receive a system broadcast message transmitted via an air interface, where the system broadcast message includes one or a combination of a DSC device identifier, a network identifier, a cluster identifier, and a service identifier.

An updating module 1402 is configured to update cluster state information according to the system broadcast message.

In an implementation, the system broadcast message further includes forward information indicating whether the system broadcast message needs to be forwarded by the receiving device.

The communication device further includes follows.

A forwarding module 1403 is configured to forward the system broadcast message to another EP via the air interface upon determining according to the forward information that the system broadcast message needs to be forwarded.

In an implementation, the forward information includes the largest number N of hops, and an indicator M of the number of hops, where M and N are natural numbers.

The forwarding module is further configured, if M is less than N, to determine that the system broadcast message needs to be forwarded, and to increase M by 1 while forwarding the system broadcast message; and if M is equal to N, to determine that the system broadcast message does not need to be forwarded.

For the sake of a convenient description, the respective components of the devices above have been described respectively as various modules or units. Of course, the functions of the respective modules or units can be performed in the same one or a plurality of pieces of software or hardware in the embodiments of the invention.

The technical solutions according to the embodiments of the invention can be implemented as follows.

Figure 15:
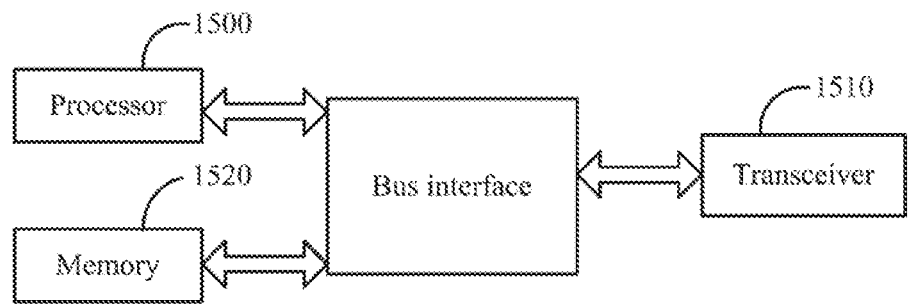
FIG. 15 is a schematic structural diagram of a DSC according to an embodiment of the invention.

FIG. 15 is a schematic structural diagram of a DSC according to an embodiment of the invention, and as illustrated, the DSC includes follows.

A processor 1500 is configured to read and execute program in a memory 1520 to perform following operations.

Determining functional parameter configuration information of the DSC, where the functional parameter configuration information includes one or a combination of: a DSC device identifier, a network identifier, a cluster identifier, cluster information, a service identifier, and a core network NSC identifier and core network NSC address information.

Determining a communication demand on the DSC according to the functional parameter configuration information.

A transceiver 1510 is configured to be controlled by the processor 1500 to transmit data and perform following operations.

Transmitting a communication request message to a corresponding device.

In an implementation, the functional parameter configuration information includes the core network NSC identifier or the core network NSC address information.

It is determined according to the functional parameter configuration information that the communication demand on the DSC is to establish a Me1 interface communication connection.

The communication request message transmitted to the NS is a Me1 interface establishment request message.

The processor can be further configured to store Me1 interface establishment success state information upon reception of a Me1 interface establishment complete message returned by the NSC.

In an implementation, the functional parameter configuration information includes the DSC device identifier, the network identifier, the cluster identifier, and the service identifier.

It is determined according to the functional parameter configuration information that the communication demand on the DSC is to broadcast in the cluster system information to be known to the devices in the cluster.

The communication request message transmitted to the corresponding device is a system broadcast message transmitted via an air interface, where the system broadcast message includes one or a combination of the DSC device identifier, the network identifier, the cluster identifier, and the service identifier.

In an implementation, the system broadcast message can further include forward information indicating whether the system broadcast message needs to be forwarded by the receiving device.

In an implementation, the processor can be further configured to perform following operations.

Receiving a Me2 interface establishment request message transmitted by another DSC, where the Me2 interface establishment request message carries one or a combination of the device identifier of the current DSC, the identifier of the current network, the identifier of the current cluster, and the identifier of a service provided by the current DSC.

Returning a Me2 interface establishment complete message to the other DSC.

In an implementation, the information carried in the Me2 interface establishment request message is obtained from the system broadcast message transmitted by the current DSC.

In an implementation, the processor can be further configured to perform following operations.

Receiving a system broadcast message transmitted by another DSC, where the system broadcast message includes one or a combination of a device identifier of the other DSC, a network identifier of the other DSC, a cluster identifier of the other DSC, and a service identifier of the other DSC.

Transmitting a Me2 interface establishment request message to the other DSC, where the Me2 interface establishment request message includes one or a combination of the device identifier of the other DSC, the network identifier of the other DSC, the cluster identifier of the other DSC, and the service identifier of the other DSC.

Receiving a Me2 interface establishment complete message returned by the other DSC.

In an implementation, the system broadcast message transmitted by the other DSC is forwarded by an EP.

In an implementation, the functional parameter configuration information includes cluster information.

It is determined according to the functional parameter configuration information that the communication demand on the DSC is to report the cluster information to a device managing the DSC on a core network.

The processor can be further configured to transmit a cluster state report message to the device managing the DSC on the core network, where the cluster state report message carries information about a cluster managed by the DSC.

In an implementation, the processor can be further configured to perform following operations.

If the cluster information is changed, transmitting a cluster state report message to the device managing the DSC on the core network, where the cluster state report message carries changed information about the cluster.

In an implementation, the processor can be further configured to perform following operations.

Transmitting a service authorization request message to a device managing the DSC on a core network after establishing a connection with the core network, where the service authorization request message carries identification information and identity verification information of the DSC.

Receiving a service authorization response message transmitted by the device managing the DSC, where the service authorization response message carries the functional parameter configuration information.

Here in FIG. 15, the bus architecture can include any number of interconnecting buses and bridges to particularly link together various circuits including one or more processors represented by the processor 1500, and one or more memories represented by the memory 1520. The bus architecture can further link together various other circuits, e.g., prophetical devices, manostats, power management circuits, etc., all of which are well known in the art, so a further description thereof will be omitted in this context. The bus interface serves as an interface. The transceiver 1510 can be a number of elements including a transmitter and a receiver which are units for communication with various other devices over a transmission medium. The processor 1500 is responsible for managing the bus architecture and performing normal processes, and the memory 1520 can store data for use by the processor 1500 in performing the operations.

Figure 16:
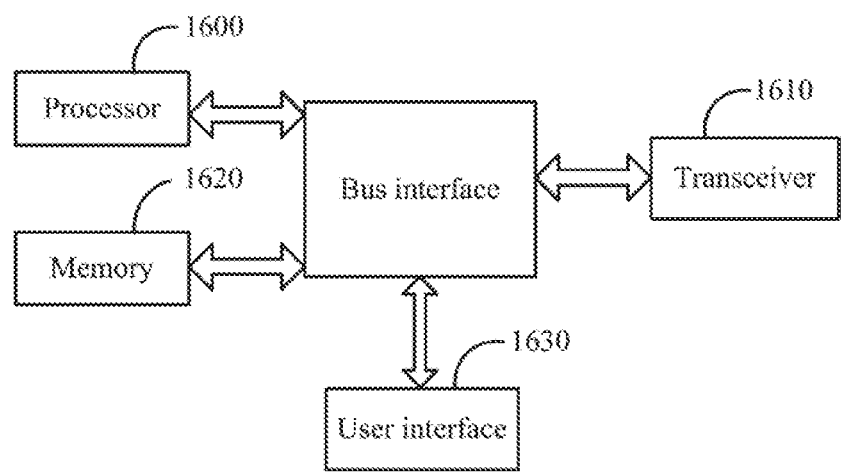
FIG. 16 is a schematic structural diagram of an EP according to an embodiment of the invention.

FIG. 16 is a schematic structural diagram of an EP according to an embodiment of the invention, and as illustrated, the EP includes following.

A processor 1600 is configured to read and execute program in a memory 1620 to perform following operations.

Updating cluster state information according to a system broadcast message.

A transceiver 1610 is configured to be controlled by the processor 1600 to transmit data and perform following operations.

Receiving a system broadcast message transmitted via an air interface, where the system broadcast message includes one or a combination of a DSC device identifier, a network identifier, a cluster identifier, and a service identifier.

In an implementation, the system broadcast message further includes forward information indicating whether the system broadcast message needs to be forwarded by the receiving device.

The processor can be further configured to forward the system broadcast message to another EP via the air interface upon determining according to the forward information that the system broadcast message needs to be forwarded.

In an implementation, the forward information includes the largest number N of hops, and an indicator M of the number of hops, where M and N are natural numbers.

The processor is further configured, if M is less than N, to determine that the system broadcast message needs to be forwarded, and to increase M by 1 after forwarding the system broadcast message; and if M is equal to N, to determine that the system broadcast message does not need to be forwarded.

Here in FIG. 16, the bus architecture can include any number of interconnecting buses and bridges to particularly link together various circuits including one or more processors represented by the processor 1600, and one or more memories represented by the memory 1620. The bus architecture can further link together various other circuits, e.g., prophetical devices, manostats, power management circuits, etc., all of which are well known in the art, so a further description thereof will be omitted in this context. The bus interface serves as an interface. The transceiver 1610 can be a number of elements including a transmitter and a receiver which are units for communication with various other devices over a transmission medium. For different user equipment, the user interface 1630 can also be an interface via which external or internal devices can be connected as appropriate, where the connected devices include but will not be limited to a keypad, a display, a speaker, a microphone, a joystick, etc.

The processor 1600 is responsible for managing the bus architecture and performing normal processes, and the memory 1620 can store data for use by the processor 1600 in performing the operations.

In summary, the technical solutions according to the embodiments of the invention mainly include following.

A solution of starting the authorized device, including that the authorized device is connected with the DSC management function of the core network, and after the identity verification is passed, the DSC control functions authorizes the device to start the DSC operating mode, obtains the configuration parameters of the DSC operating mode, and finally starts the DSC operating mode. A solution of establishing a Me1 interface with the core network NSC after initiating DSC, including that after the DSC is started, the DSC establishes the Me1 interface with the core network NSC. A solution of transmitting the system message over multiple hops via the air interface, including that after the DSC is started, the DSC transmits the system message over multiple hops via the air interface. A solution concerns to that the DSC discovers the adjacent cluster, and establishes the Me2 interface, where the adjacent cluster can be discovered directly via the air interface, or can be discovered directly. A solution concerns to that the DSC notifies the DSC management function of the core network of the cluster information, and the DSC management function stores the cluster information. A solution concerns to that the DSC function (or the DSC operating mode) can be decoupled from the hardware device (authorized device).

With the technical solutions above, the dynamic distributed network architecture can be provided to thereby greatly reduce a burden of storage and signaling handling on the core network due to an accessing device; and the control function can be localized to thereby greatly shorten a delay in the control-plane signaling procedure. Furthermore since the DSC function is decoupled from the authorized device in terms of software and hardware, the dynamic network including the DSC and the accessing device is also characterized in high flexibility thereof.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The invention claimed is:

1. A communication method, comprising:
   determining functional parameter configuration information of a Distributed Service Center (DSC), wherein the functional parameter configuration information comprises one or a combination of: a DSC device identifier, a network identifier, a cluster identifier, cluster information, a service identifier, and a network service center (NSC) identifier of a core network and NSC address information of the core network;
   determining a communication demand on the DSC according to the functional parameter configuration information; and
   transmitting a communication request message to a corresponding device
   wherein: the DSC is built through an Authorized Device (AD) with a DSC function which subscribes in advance with an operator for authorization of the DSC function; the DSC and MTC-like accessing terminals (EPs) constitute a dynamic network in a self-organized manner, and the DSC is responsible for managing the dynamic network; the DSC establishes a control-plane interface with the NSC and exchanges information with the NSC; the DSC transmits information by broadcasting the information among cluster members including the EPs via an air interface.

2. The method according to claim 1, wherein the functional parameter configuration information comprises the NSC identifier or the NSC address information;
   determining the communication demand on the DSC according to the functional parameter configuration information comprises:
   establishing a Me1 interface communication connection; and
   the communication request message transmitted to the NSC is a Me1 interface establishment request message; and
   the method further comprises: storing Me1 interface establishment success state information upon reception of a Me1 interface establishment complete message returned by the NSC.

3. The method according to claim 1, wherein the functional parameter configuration information comprises the DSC device identifier, the network identifier, the cluster identifier, and the service identifier;
   determining the communication demand on the DSC according to the functional parameter configuration information comprises:
   broadcasting in the cluster system information to be known to devices in the cluster; and
   the communication request message transmitted to the corresponding device is a system broadcast message transmitted via an air interface, wherein the system broadcast message comprises one or a combination of the DSC device identifier, the network identifier, the cluster identifier, and the service identifier.

4. The method according to claim 3, wherein the system broadcast message further comprises forward information indicating whether the system broadcast message needs to be forwarded by a receiving device.

5. The method according to claim 1, further comprises:
   receiving a Me2 interface establishment request message transmitted by another DSC, wherein the Me2 interface establishment request message carries one or a combination of the device identifier of the DSC, the identifier of the network, the identifier of the cluster, and the identifier of a service provided by the DSC; and
   returning a Me2 interface establishment complete message to another DSC.

6. The method according to claim 5, wherein information carried in the Me2 interface establishment request message is obtained from the system broadcast message transmitted by the DSC.

7. The method according to claim 1, further comprises:
   receiving a system broadcast message transmitted by another DSC, wherein the system broadcast message comprises one or a combination of a device identifier of another DSC, a network identifier of another DSC, a cluster identifier of another DSC and a service identifier of another DSC;
   transmitting a Me2 interface establishment request message to another DSC, wherein the Me2 interface establishment request message comprises one or a combination of the device identifier of another DSC, the network identifier of another DSC, the cluster identifier of another DSC and the service identifier of another DSC; and
   receiving a Me2 interface establishment complete message returned by another DSC.

8. The method according to claim 7, wherein the system broadcast message transmitted by another DSC is forwarded by an End Point (EP).

9. The method according to claim 1, wherein the functional parameter configuration information comprises cluster information;
   determining the communication demand on the DSC according to the functional parameter configuration information comprises:
   reporting the cluster information to a device managing the DSC on a core network; and
   a cluster state report message is transmitted to a device managing the DSC on a core network, wherein the cluster state report message carries information about a cluster managed by the DSC.

10. The method according to claim 9, further comprises:
    transmitting a cluster state report message to the device managing the DSC on the core network when the cluster information is changed, wherein the cluster state report message carries changed information about the cluster.

11. The method according to claim 1, further comprises:
    transmitting a service authorization request message to a device managing the DSC on a core network after establishing a connection with the core network, wherein the service authorization request message carries identification information of the DSC and identity verification information of the DSC; and
    receiving a service authorization response message transmitted by the device managing the DSC, wherein the service authorization response message carries the functional parameter configuration information.

12. A communication method, comprising:
    receiving a communication request message transmitted by a DSC; and
    responding to the communication request message;
    wherein: the DSC is built through an Authorized Device (AD) with a DSC function that subscribes in advance with an operator for authorization of the DSC function; the DSC and MTC-like accessing terminals (EPs) constitute a dynamic network in a self-organized manner, and the DSC is responsible for managing the dynamic network; the DSC establishes a control-plane interface with the NSC and exchanges information with the NSC; the DSC transmits information by broadcasting the information among cluster members including the EPs via an air interface.

13. The method according to claim 12, wherein the communication request message transmitted by the DSC is a Me1 interface establishment request message; and
    responding to the communication request message comprises returning a Me1 interface establishment complete message.

14. The method according to claim 12, wherein the communication request message transmitted by the DSC is a cluster state report message carrying information about a cluster managed by the DSC; and
    responding to the communication request message comprises storing information about the cluster managed by the DSC, carried in the cluster state report message according to the communication request message.

15. The method according to claim 12, wherein:
    the communication request message transmitted by the DSC is a service authorization request message transmitted by the DSC after establishing a connection with a core network, wherein the service authorization request message carries identification information of the DSC and identity verification information of the DSC; and responding to the communication request message comprises:

determining functional parameter configuration information of the DSC according to the identification information of the DSC and the identity verification information of the DSC, and subscription information, wherein the functional parameter configuration information comprises one or a combination of a DSC device identifier, a network identifier, a cluster identifier, cluster information, a service identifier, and a NSC identifier of a core network or a NSC address information of the core network;

transmitting a service authorization response message to the DSC, wherein the service authorization response message carries the functional parameter configuration information.

16. A communication method, comprising:

receiving a system broadcast message transmitted via an air interface, wherein the system broadcast message comprises one or a combination of a DSC device identifier, a network identifier, a cluster identifier and a service identifier; and updating cluster state information according to the system broadcast message;

wherein: the DSC is built through an Authorized Device (AD) with a DSC function that subscribes in advance with an operator for authorization of the DSC function; the DSC and MTC-like accessing terminals (EPs) constitute a dynamic network in a self-organized manner, and the DSC is responsible for managing the dynamic network; the DSC establishes a control-plane interface with the NSC and exchanges information with the NSC; the DSC transmits information by broadcasting the information among cluster members including the EPs via an air interface.

17. The method according to claim 16, wherein the system broadcast message further comprises forward information indicating whether the system broadcast message needs to be forwarded by a receiving device; and the method further comprises: forwarding the system broadcast message to an EP via the air interface upon determining that the system broadcast message needs to be forwarded according to the forward information.

18. The method according to claim 17, wherein the forward information comprises a largest number N of hops, and an indicator M of the number of hops, wherein M and N are natural numbers; and when M is less than N, determining that the system broadcast message needs to be forwarded, and M will be increased by 1 after forwarding the system broadcast message; and when M is equal to N, determining that the system broadcast message does not need to be forwarded.

* * * * *